(12) United States Patent
Buarque de Macedo

(10) Patent No.: US 7,695,560 B1
(45) Date of Patent: Apr. 13, 2010

(54) STRONG, LOWER DENSITY COMPOSITE CONCRETE BUILDING MATERIAL WITH FOAM GLASS AGGREGATE

(76) Inventor: Pedro M. Buarque de Macedo, 6100 Highboro Dr., Bethesda, MD (US) 20814

( * ) Notice: Subject to any disclaimer, the term of this patent is extended or adjusted under 35 U.S.C. 154(b) by 635 days.

(21) Appl. No.: 11/601,409

(22) Filed: Nov. 17, 2006

Related U.S. Application Data

(60) Provisional application No. 60/741,209, filed on Dec. 1, 2005.

(51) Int. Cl.
*C04B 28/10* (2006.01)
(52) U.S. Cl. .................................................. 106/716
(58) Field of Classification Search ................. 106/716
See application file for complete search history.

(56) References Cited

U.S. PATENT DOCUMENTS

| | | | |
|---|---|---|---|
| 2,281,524 A | 4/1942 | Meyers |
| 2,466,613 A | 4/1949 | Richardson |
| 2,620,597 A | 12/1952 | Ford |
| 2,758,937 A | 8/1956 | Ford |
| 2,991,591 A | 7/1961 | Gabor et al. |
| 3,056,184 A | 10/1962 | Blaha |
| 3,124,637 A | 3/1964 | Heitzer |
| 3,186,816 A | 6/1965 | Wartenberg |
| 3,269,887 A | 8/1966 | Windecker |
| 3,273,833 A | 9/1966 | Windecker |
| 3,292,316 A | 12/1966 | Zeinetz |
| 3,321,414 A | 5/1967 | Sieli |
| 3,325,341 A | 6/1967 | Shannon |
| 3,328,229 A | 6/1967 | Windecker |
| 3,396,922 A | 8/1968 | Windecker |
| 3,396,923 A | 8/1968 | Windecker |
| 3,416,756 A | 12/1968 | Windecker |

(Continued)

FOREIGN PATENT DOCUMENTS

JP 02003313067 A * 11/2003

(Continued)

OTHER PUBLICATIONS

JP 02003313067 A (Nagao et al.) Nov. 6, 2003. abstract only.*

(Continued)

*Primary Examiner*—Paul Marcantoni
(74) *Attorney, Agent, or Firm*—Amster, Rothstein & Ebenstein LLP

(57) ABSTRACT

The present invention relates to a composite concrete building material comprising cementatious materials; and foam glass aggregates. The cementatious materials may comprise cement, sand and fly ash. The cementatious materials may also comprise other materials, including, for example, reinforcing fibers. In one embodiment the reinforcing fibers are comprised of one or more of the following materials: glass, steel, titanium, other metals, carbon, or Kevlar. The foam glass aggregates may have a closed pore structure and average pore size of 1.0 mm or less, wherein said average pore size is measured based on the distance between two farthest points of pore surface. The foam glass aggregate may have an average density of 30 to 100 PCF. The foam glass aggregate may have a compression strength of 2000 PSI or greater. The foam glass aggregates may be on average between 0.1 inches and approximately 2.0 inches in their largest diameter.

27 Claims, 2 Drawing Sheets

U.S. PATENT DOCUMENTS

| | | | |
|---|---|---|---|
| 3,427,689 A | 2/1969 | Windecker | |
| 3,430,397 A | 3/1969 | Ellis | |
| 3,448,546 A | 6/1969 | Windecker | |
| 3,459,565 A | 8/1969 | Jones et al. | |
| 3,467,345 A | 9/1969 | Windecker | |
| 3,493,460 A | 2/1970 | Windecker | |
| 3,518,156 A | 6/1970 | Windecker | |
| 3,519,228 A | 7/1970 | Windecker | |
| 3,533,880 A | 10/1970 | Windecker | |
| 3,537,220 A | 11/1970 | Ellis | |
| 3,549,449 A | 12/1970 | Windecker | |
| 3,592,619 A | 7/1971 | Elmer et al. | |
| 3,607,595 A | 9/1971 | Windecker | |
| 3,614,967 A | 10/1971 | Royston | |
| 3,666,850 A | 5/1972 | Windecker | |
| 3,674,585 A | 7/1972 | Windecker | |
| 3,812,635 A | 5/1974 | Hala | |
| 3,814,614 A * | 6/1974 | Kraemer | 106/605 |
| 3,848,335 A | 11/1974 | Bergersen | |
| 3,951,632 A | 4/1976 | Seki et al. | |
| 3,959,541 A | 5/1976 | King et al. | |
| 3,979,217 A | 9/1976 | Sutton | |
| 3,986,311 A | 10/1976 | Muhe et al. | |
| 4,024,309 A | 5/1977 | Pender | |
| 4,051,296 A | 9/1977 | Windecker | |
| 4,058,943 A | 11/1977 | Sturgil | |
| 4,119,422 A | 10/1978 | Rostoker | |
| 4,119,583 A | 10/1978 | Filip et al. | |
| 4,124,365 A | 11/1978 | Williams et al. | |
| 4,178,162 A | 12/1979 | Shono et al. | |
| 4,196,251 A | 4/1980 | Windecker | |
| 4,198,224 A | 4/1980 | Kirkpatrick | |
| 4,232,069 A | 11/1980 | Windecker | |
| 4,259,118 A | 3/1981 | Sack | |
| 4,283,457 A | 8/1981 | Kolsky et al. | |
| 4,324,037 A | 4/1982 | Grady, II | |
| 4,332,907 A | 6/1982 | Vieli | |
| 4,332,908 A | 6/1982 | Vieli | |
| 4,347,326 A | 8/1982 | Iwami et al. | |
| 4,424,280 A | 1/1984 | Malric | |
| 4,430,108 A | 2/1984 | Hojaji et al. | |
| 4,440,296 A | 4/1984 | Howe et al. | |
| 4,450,656 A | 5/1984 | Lagendijk | |
| 4,571,321 A | 2/1986 | Kijowski et al. | |
| 4,595,710 A | 6/1986 | Albertelli et al. | |
| 4,623,585 A | 11/1986 | Linton et al. | |
| 4,628,652 A | 12/1986 | Wefels | |
| 4,694,622 A | 9/1987 | Richard | |
| 4,710,415 A | 12/1987 | Slosberg et al. | |
| 4,758,538 A | 7/1988 | Satoh et al. | |
| 4,798,758 A | 1/1989 | Nagano et al. | |
| 4,833,015 A | 5/1989 | Furuuchi et al. | |
| 4,875,314 A | 10/1989 | Boilen | |
| 4,879,159 A | 11/1989 | Furuuchi | |
| 4,903,446 A | 2/1990 | Richards et al. | |
| 4,953,332 A | 9/1990 | Galloway | |
| 4,987,028 A | 1/1991 | Kandachi et al. | |
| 4,990,398 A | 2/1991 | Fukumoto et al. | |
| 4,992,321 A | 2/1991 | Kandachi et al. | |
| 5,069,960 A | 12/1991 | Fukumoto et al. | |
| 5,151,228 A | 9/1992 | Vahlbrauk | |
| 5,188,649 A | 2/1993 | Macedo et al. | |
| 5,205,091 A | 4/1993 | Brown | |
| 5,231,811 A | 8/1993 | Andrepont et al. | |
| 5,451,465 A | 9/1995 | Garrioch | |
| 5,476,692 A | 12/1995 | Ellis et al. | |
| 5,514,198 A | 5/1996 | Bayle et al. | |
| 5,516,351 A | 5/1996 | Solomon et al. | |
| 5,588,977 A | 12/1996 | Pavlov et al. | |
| 5,641,815 A | 6/1997 | Fehlmann | |
| 5,763,341 A | 6/1998 | Pavlov et al. | |
| 5,809,713 A | 9/1998 | Ray | |
| 5,821,184 A | 10/1998 | Haines et al. | |
| 5,862,640 A | 1/1999 | Negri | |
| 6,042,905 A | 3/2000 | Lingart et al. | |
| 6,082,063 A | 7/2000 | Shrive et al. | |
| 6,133,172 A | 10/2000 | Sevenish et al. | |
| 6,174,587 B1 | 1/2001 | Figge, Sr. | |
| 6,207,236 B1 | 3/2001 | Araki et al. | |
| 6,212,840 B1 | 4/2001 | Davidovitz | |
| 6,414,238 B2 | 7/2002 | Boe | |
| 6,468,613 B1 | 10/2002 | Kitano et al. | |
| 6,616,752 B1 * | 9/2003 | Basura et al. | 106/716 |
| 6,642,164 B2 * | 11/2003 | Akaishi | 501/80 |
| 6,721,684 B1 | 4/2004 | Saebi | |
| 6,964,809 B2 | 11/2005 | Hojaji et al. | |
| 6,967,051 B1 | 11/2005 | Augustynowicz et al. | |
| 2001/0018836 A1 | 9/2001 | Schmidt et al. | |
| 2002/0010223 A1 | 1/2002 | Botrie | |
| 2003/0134920 A1 | 7/2003 | Poisl et al. | |
| 2003/0145534 A1 | 8/2003 | Hojaji et al. | |
| 2004/0071960 A1 | 4/2004 | Weber et al. | |
| 2004/0079260 A1 | 4/2004 | Datta et al. | |
| 2004/0080063 A1 | 4/2004 | Datta et al. | |
| 2004/0081827 A1 | 4/2004 | Datta et al. | |
| 2004/0123535 A1 | 7/2004 | Hojaji et al. | |
| 2004/0262801 A1 | 12/2004 | Hojaji et al. | |
| 2005/0016093 A1 | 1/2005 | Buarque De Macedo | |
| 2005/0019542 A1 | 1/2005 | Hojaji et al. | |
| 2006/0075704 A1 | 4/2006 | Hojaji et al. | |

FOREIGN PATENT DOCUMENTS

WO    WO 2003097553    * 11/2003

OTHER PUBLICATIONS

JP 02003313067 A (Nagao et al.) Nov. 6, 2003. Machine Translation into English.*

McGraw Hill Dictionary of Scientific and Technical Terms, 5th ed., 1994 pp. 785 and 904, McGraw Hill, Inc., New York, U.S.A.

Pittsburgh Corning Foamglas Insulation, 2004, Pittsburgh Corning Corporation.

* cited by examiner

STRONG, LOWER DENSITY COMPOSITE CONCRETE BUILDING MATERIAL WITH FOAM GLASS AGGREGATE

CROSS-REFERENCE TO RELATED APPLICATION

This application claims priority from U.S. provisional patent application Ser. No. 60/741,209, filed Dec. 1, 2005, the content of which is incorporated by reference herein in its entirety.

FIELD OF THE INVENTION

The present invention relates generally to composite concrete building materials which comprise cement and foam glass aggregate. More particularly, the present invention relates to a strong, lower density composite concrete building material which comprises cement and foam glass aggregate that has strong bonds between the cement and foam glass aggregate. The strong, lower density concrete building materials of the present invention can be used as structural support, such as support panels and flooring, in buildings, as well as other traditional uses where strong concrete is required. The strong, lower density composite concrete material can also be used as a building material to be used on higher floors of high rise buildings, bridge structures, and other structural applications which require strong building materials of lower density.

BACKGROUND OF THE INVENTION

In construction, concrete is a composite building material made from the combination of aggregate and cement binder. The most common form of concrete is Portland cement concrete, which consists of mineral aggregate (generally gravel and sand), Portland cement and water. When water is added to the concrete mixture, the cement hydrates, gluing the other components together and eventually creating a stone-like material. When used in the generic sense, this is the material referred to by the term concrete. Concrete is used to make pavements, building structures, foundations, motorways/roads, overpasses, parking structures, and bases for gates/fences/poles. The shortcomings in conventional concrete as a building material are now described.

One problem with concrete is that it is very heavy with respect to its unit volume. Due to this high density, when concrete is used as a building material, additional support is required to compensate for this heavy weight. Thus, some have tried in the past to make lower density concrete (and thus lighter concrete) by placing air/gas bubbles in the concrete. The problem of most methods used to lower density is that such methods also lower strength. That may be acceptable for a wall panel, but not for a support structure. When the density is lower in a structural panel, it is less strong, and thus requires an increased volume of concrete to insure that it is sufficiently supported. Thus, what is needed is a lighter concrete material which retains the strength typically associated with heavier concrete.

Another method used in the past to lower the density of concrete (having a specific gravity of approximately 2.4) has been to use low density aggregates, such as sea shells (having a specific gravity of approximately 1.55), to lower the density of the concrete (and thus lighten the concrete). The combination of concrete with aggregate is referred to herein as "composite concrete". Aggregate is the component of a composite material used to resist compressive stress. For efficient filling, aggregate should be much smaller than the finished item, but have a wide variety of sizes. The "cementatious portion" of "composite concrete" can be comprised of cement, sand and possibly other additives, such as fly ash. Composite concrete which contains the sea shell aggregate has a lower density (118 lbs/cubic foot (PCF)), as compared to typical concrete (140-150 PCF). The use of sea shells as an aggregate in composite concrete reduces the weight of a structural member by approximately 17%, when the composite concrete is comprised 60 wt % cementation portion (e.g., cement, sand and fly ash), 32.5 wt % sea shell aggregate and 7.5 wt % air. While this composite concrete is useful, it is highly desirable to develop a Composite concrete which has an average density of less than 110 PCF.

Other attempts to lower the density of composite concrete have been made by using other low density aggregates, such as plastics. However, the problem with using these other types of aggregates in composite concrete is that when stressed, the composite concrete will tend to crack along the interface of the aggregates and the cementatious portion. It substantially weakens the resulting product if the boundary is weaker than either phase (aggregate or cementatious portion). This results in a weaker composite concrete. Thus, what is needed is a lower density aggregate that will be strong and adhere to the cementatious portion, so as to form a stronger, lower density composite concrete.

The concept of using foam glass as a construction material is also well known in the prior art. Generally such foam glass has been used as a high temperature insulator and thus seeks to minimize its density and weight and is not used as an aggregate or filler for composite concrete in building materials. The shortcoming in such conventional foam glass as relevant to this long standing problem is now described.

For example, Pittsburgh Corning Corporation ("PCC") of Pittsburgh, Pa. has developed and marketed a product known as Foam Glas® Insulation Systems, which is described in U.S. Pat. Nos. 3,959,541, 4,119,422, 4,198,224, 4,571,321 and 4,623,585. Since the purpose of this tile is to be used as thermal insulation, it lacks surface strength, and can be dented very easily. Because the Foam Glas® Insulation Systems tile is of relatively low density, e.g., 9.5 PCF, such tiles will easily break when exerted to forces typically asserted on structural members of a building.

Unlike the prior art discussed above, the composite concrete using foam glass aggregate of the present invention can be used like concrete, but has a greater strength per unit weight.

Thus, while the prior art is of interest, the known methods and apparatus of the prior art present several limitations which the present invention seeks to overcome.

In particular, it is an object of the present invention to provide a strong, lower density composite concrete which comprises cementatious portion and foam glass aggregate which can be used as a structural member of a building.

It is a further object of the present invention to make a lightweight aggregate that when used in composite concrete has substantially higher strength to weight ratio than concrete.

It is another object of the present invention to make an aggregate that will not absorb substantial amounts of water from the wet concrete when it is formed.

A still further object of the present invention is to make an aggregate that will form a strong bond with the cementatious portion when formed into a composite concrete.

These and other objects will become apparent from the foregoing description.

SUMMARY OF THE INVENTION

It has now been found that the above and related objects of the present invention are obtained in the form of a composite concrete comprising a cementatious portion and a foam glass aggregate which can be used as a structural member in a building or other construction.

The present invention relates to a composite concrete building material comprising cementatious materials; and foam glass aggregates. The cementatious materials may comprise cement, sand and fly ash. The cementatious materials may also comprise other materials, including for example, reinforcing fibers. In one embodiment the reinforcing fibers are comprised of one or more of the following materials: glass, steel, titanium, other metals, carbon, or Kevlar.

In the present invention, the foam glass aggregates may have a closed pore structure and average pore size of 1.0 mm or less, wherein the average pore size is measured based on the distance between two farthest points of pore surface. More preferably, the foam glass aggregates may have an average pore size of 0.8 mm or less, or more preferably, 0.6 mm or less, or more preferably 0.4 mm or less, or more preferably 0.2 mm or less.

In the present invention, the foam glass aggregate may have an average density of between 30 and 100 PCF. More preferably, the foam glass aggregate may have an average density of 80 PCF or less, or more preferably 60 PCF or less, or even more preferably 50 pounds per cubit foot or less. The foam glass aggregate of the present invention may also have an average density of 40 PCF or greater.

In the present invention, the foam glass aggregate may have a compression strength of at least 2000 PSI. More preferably, the foam glass aggregate may have a compression strength of 3000 PSI or greater, and more preferably 4000 PSI or greater, and more preferably, 5000 PSI or greater, and more preferably 6000 PSI or greater.

In the present invention, the foam glass aggregates may be on average approximately 2 inches in their largest diameter or less. More preferably, the foam glass aggregates may be on average approximately 1.0 inch in their largest diameter or less, and more preferably, approximately 0.75 inches in their largest diameter or less, or more preferably approximately 0.5 inches in their largest diameter or less. The foam glass aggregates of the present invention may be on average approximately 0.1 inches in their largest diameter or greater.

In the present invention, the average density of the composite concrete of the present invention may be less than 110 PCF. More preferably, the average density of the composite concrete of the present invention may be less than 100 PCF, or less than 90 PCF.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAILED DESCRIPTION OF THE INVENTION

Figure 1:
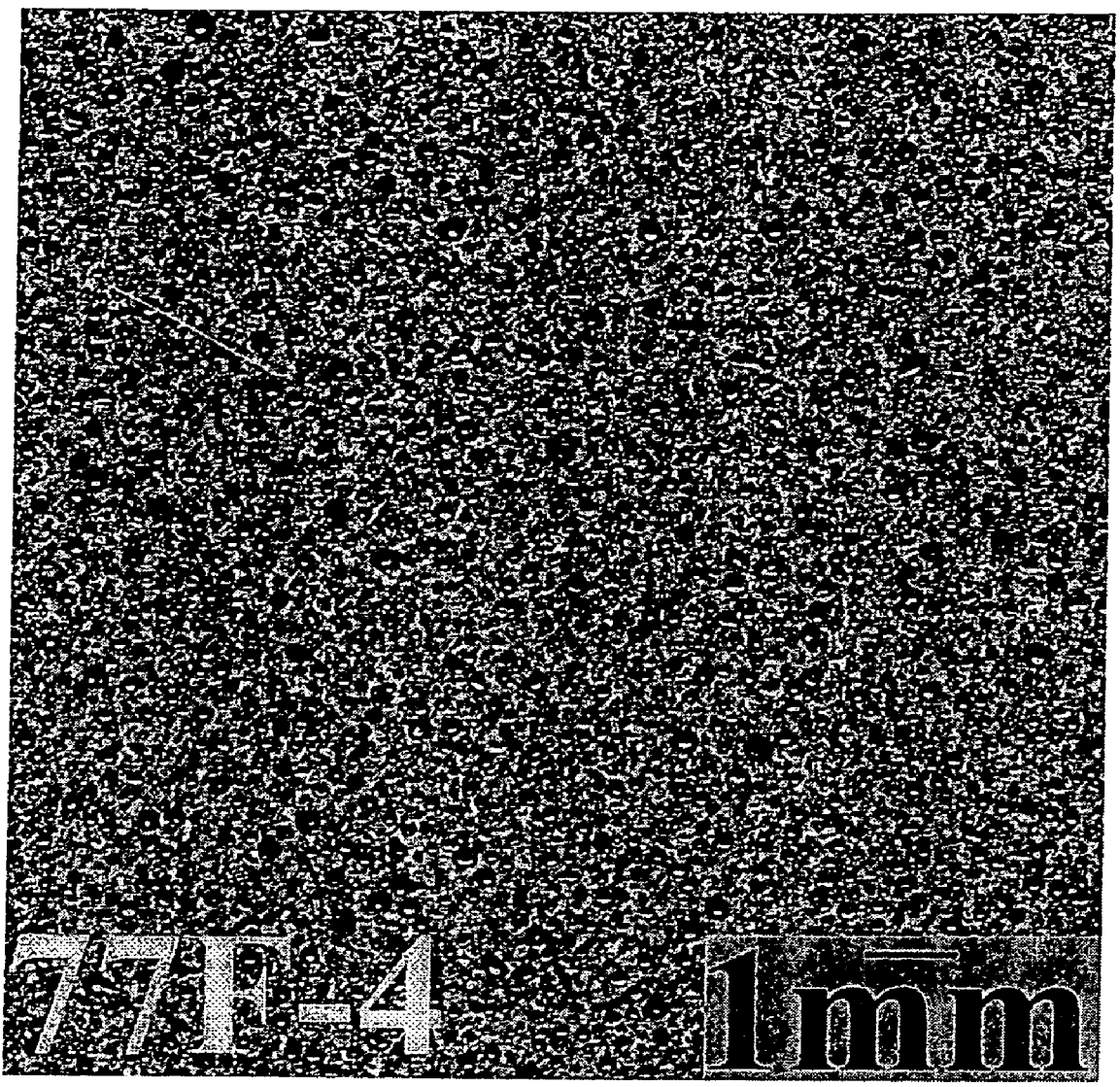
FIG. 1 is a picture of an example of a foam glass aggregate of the present invention that has been cut to expose the bubbles.

The present invention relates generally to composite concrete building materials which comprise cementatious portion and foam glass aggregate. More particularly, the present invention relates to a strong, lower density composite concrete building material which comprises cementatious portion and foam glass aggregate that has strong bonds between the cementatious portion and the foam glass aggregate. The strong, lower density concrete building materials of the present invention can be used as structural support, such as support panels and flooring, in buildings, as well as other traditional uses where strong concrete is required. The strong, lower density concrete building material of the present invention is also useful as a building material to be used on higher floors of high rise buildings, bridge structures, and other structural applications which require strong building materials of lower density.

The cementatious portion of the composite concrete of the present invention may comprise cement, sand and other additives such as fly ash. The cementatious portion may also contain air.

The composite cement may also include other materials in the cementatious portion, such as additional reinforcement including fibers to increase the strength of the composite cement. Examples of such fibers can be made out of glass, steel, titanium, other metals, carbon, Kevlar, and other fibers known in the art to reinforce cement.

The aggregate portion of the composite concrete of the present invention is comprised of foam glass aggregate. In the preferred embodiment, the foam glass aggregate of the present invention can be manufactured using raw materials which include (but are not necessarily limited to) silica, fly ash, volcanic ash, diatomaceous earth, siliceous minerals, alkali carbonates, calcium and magnesium minerals such as dolomite, and gypsum, sodium silicate, borax, glass powders (such as cullet) and foaming agents. The foaming agent can be selected from carbonaceous organics such as sugar and starch, carbon black, silicon carbide, carbonates, sulfates and other like materials.

To make the foam glass aggregate of the present invention, various methods can be used. In one embodiment, the starting raw materials to make the foam glass aggregate are blended together with water to form a homogenous slurry. It must be noted that even though the preferred method of mixing is wet, nonetheless, dry blending may be selected depending on the type of raw materials used in foam glass formulation. For instance, when glass powders (soda-lime glass cullet) are used as major raw material, the gasifier can be dry blended in a conventional mixer, such as a ball mill. When wet blending is used, the solid content of the slurry is preferably between 30-80 wt %, and more preferably between 50-70 wt %.

The slurry is then dried in a conventional dryer such as a spray dryer to produce dry powders. If a static dryer is used, then the dried aggregates are ground to form dried powders. The resulting powdery product is then calcined to a temperature at which the viscosity of the resulting foam glass is preferably between $10^7$ to $10^2$ poise, more preferably between $10^5$ to $10^3$ poise. Calcination may be carried out in a reducing environment to effectively pyrolize organic gasifiers to microscopic carbon containing compounds. In the case of silicon carbide as a foaming agent, calcination may be carried out in a neutral air atmosphere. When glass powders are used as major ingredients in the foam glass formulations, the calcination step is the same as the foaming step. Calcination can be carried out in a rotary kiln, in stationary molds in a kiln, or in a fludizied bed reactor heated primarily by a hot gas.

The calcined product may require pulverization if calcination for instance is carried out in stationary molds. Calcination by fludization may not require pulverization, if particles do not agglomerate in the fludized bed. The calcined powders are screened preferably through 20 mesh screen, more preferably through 40 mesh screen, and even more preferably though 100 mesh screen to remove the coarse particles.

The powders are then molded into desired shapes, in a metal mold. The preferred metals are stainless steel and chromium containing alloys such as Inconer™ Inco Alloys. Inconel™ type alloys are preferred, since they can resist thermal cycles, and oxidation better than stainless steels.

The molds are then transferred into either electric or gas fired kilns. The heating rate is determined based upon the thickness of the sample. The thinner the sample, the higher the rate is available. At the peak foaming temperature the foam glass viscosity is between $10^5$ to $10^3$ poise. The soak time at the peak firing temperature depends on the foam glass dimensions.

The foam glass is then cooled.

In order to qualify as an appropriate foam glass aggregate for composite concrete of the present invention, the foam glass aggregate must meet the following requirements: (1) a higher strength to weight ratio than composite concrete of the prior art; (2) have a closed pore structure; (3) form strong bonds between the foam glass aggregate and the cementatious portion; and (4) be of a size in appropriate relative portion to the composite concrete so as to be substantially less than the smallest dimension of the concrete composite, without being unduly small. All four of these requirements are met by the use of the foam glass aggregate of the present invention.

In particular, the foam glass aggregate of the present invention is a closed pore foam glass with small pore sizes (e.g., less than 1.0 mm, and preferably less than 0.8 mm, 0.6 mm, 0.4 mm or 0.2 mm) and with a density varying between 30 and 100 PCF, and compressional strength of the foam glass aggregate greater than 2000 PSI, 3000 PSI, 4000 PSI, 5000 PSI or 6000 PSI.

Examples of such foam glass aggregate are disclosed in U.S. Pub. No. 2005/0019542 A1 ("the '542 Publication") as Examples 3-9 and U.S. Pub. No. 2005/0016093 A1 ("the '093 Publication") as Examples 1-7, both of which are hereby incorporated by reference in their entirety. Additional descriptions on how to make foam glasses with a variety of densities is provided in U.S. Pat. No. 6,964,809 B2, which is also hereby incorporated by reference in its entirety.

Examples 3-9 of the '542 Publication, which correspond to Examples 1-7 of the '093 Publication, demonstrate examples of a range of foam glass material which could be used as foam glass aggregate in composite concrete of the present invention. The details of how to manufacture these Examples are shown in the '093 and '542 Publications, which are hereby incorporated by reference, and in Table 1 below (which corresponds to Table 3 of the '542 Publication and Table 1 of the '093 Publication). Table 1 below also provides the characteristics of the resulting samples.

TABLE 1

|  | Example | | | | | | |
| --- | --- | --- | --- | --- | --- | --- | --- |
|  | 1 | 2 | 3 | 4 | 5 | 6 | 7 |
| Composition | | | | | | | |
| Silica sand (g) | 80 | 80 | 80 | 80 | 80 | 80 | 50 |
| Fly Ash (g) | 0 | 20 | 20 | 20 | 20 | 20 | 50 |
| $Fe_2O_3$ (g) | 3.4 | | | | | | |
| Sodium Silicate, $5H_2O$ (g) | 30 | 30 | 30 | 30 | 25 | 25 | 30 |
| Borax, $5H_2O$ (g) | 25 | 15 | 25 | 25 | 30 | 30 | 25 |
| Alumina (g) | 5 | | | | | | |
| Sugar (g) | 2 | 3 | 3 | 3 | 3 | 3 | 2 |
| Water (g) | 25 | 25 | 24 | 25 | 25 | 25 | 25 |
| Batch Size Factor | 20× | 20× | 60× | 40× | 50× | 50× | 20× |
| Process Information | | | | | | | |
| Calcination temp., °C. | 970 | 970 | 970 | 970 | 970 | 970 | 970 |
| Calcination time, min. | 30 | 30 | 30 | 30 | 30 | 30 | 30 |
| Foaming temp., °C. | 810 | 800 | 790 | 810 | 795 | 795 | 810 |
| Foaming time, min. | 10 | 10 | 10 | 10 | 10 | 10 | 10 |
| Foaming mesch size | 100 | 100 | 100 | 100 | 100 | 100 | 100 |
| Characteristics | | | | | | | |
| Density (PCF) | 32 | 36 | 41 | 46 | 62 | 65 | 69 |
| Bubbles/cm | 12 | 18 | 12 | 20 | 13 | 18 | 29 |
| Characteristic length (mm) | 0.8 | 0.6 | 0.8 | 0.5 | 0.8 | 0.6 | 0.3 |
| Compression strength (PSI) | 2078 | 2400 | 4300 | 6000 | 10500 | 12500 | 14600 |
| Tension strength (PSI) | 775 | 930 |  | 960 | 1250 | 1400 | 2500 |
| Glazed Top Surface (closed pore outer skin) | Yes | Yes | Yes | Yes | Yes | Yes | Yes |

The foam glass aggregate in Examples 1-7 were made by blending the raw materials set forth under Composition in Table 1 herein.

In order to make a useful comparison, the weight of the composition was normalized assuming the total amount of silica plus fly ash equal 100. Thereafter, to insure the proper amount of material is used the normalized composition weight is multiplied by an appropriate batch size factor, as indicated in Table 1, to account for the size of the mold being used. For example, a batch size factor of 50× has been used for a mold 8 inches×14 inches×4 inches, The resulting slurry was dried, and the powder mixture was calcined at a temperature between 900° C. and 1100° C., as indicated in the process section of Table 1, for between 5 to 60 minutes, as indicated in the process section of Table 1, to react the raw materials, and decompose sugar to finely, and evenly dispersed carbonaceous phase. The calcined product was ground to fine powders, placed in an Inconel™ mold, and was foamed by heating at a temperature between 750° C. and 900° C., as indicated in the process section of Table 1, and soaked at that temperature for between 10 to 60 minutes, as indicated in the process section of Table 1. The resulting foam glass was annealed to room temperature and de-molded.

The characteristics of the resulting foam glass for Examples 1 to 7 are indicated in the characteristics portion of Table 1. The resulting foam glass had a density of about 30 and 70 PCF, as indicated in the characteristics section of Table 1, and a completely glazed surface. The pore structure was uniform with average pore sizes as indicated in the characteristics section of Table 1. As Table 1 shows, aggregate with smaller pore sizes, high density and uniform structures provided have the greatest tensile and compression strength.

In order to determine the strength of the samples of foam glass prepared, an effort was made to follow the standard ASTM testing procedures for concrete. However, because the samples proved to be substantially stronger than concrete, the procedures had to be modified by reducing the size of the samples in order for the equipment used to actually break the samples. Thus, foam glass blocks were cut into cylinders between 1.0 and 1.5 inches in diameter and less than 5 inches tall for compression measurements without the glazed surface. As indicated in the characteristics portion of Table 1, the compression strength of Examples 5-7 were over 10,000 PSI, substantially larger than the compression strength of composite concrete of the prior art (approximately 5,000-6,000 PSI). Similarly, as indicated in the characteristics portion of Table 1, the tensile strength of Examples 5-7 were over 1250 PSI, a factor of over 2½ times the tensile strength of composite concrete (500 PSI). Example 7 has a tensile strength of 2500 PSI, a factor of 5 times the tensile strength of composite concrete.

The bubble or pore size is very important in determining the strength. The larger the bubble means the weaker the foam glass. The phrase "the weakest link breaks the chain" becomes "the largest bubble breaks the foam glass." Thus, one needs a consistent manner to measure the bubble size. In the present examples, the bubble size was measured by first cutting the piece of foam glass being measured, e.g. with a diamond saw, to expose the bubbles. The exposed bubbles are measured by counting the number of bubbles in a given line one centimeter or longer. The bubble size in this direction is the length of the line divided by the number of bubbles. The measurement is repeated several times until there is a consistent result. If the bubbles are spherical, varying the line direction makes little or no difference. If the bubbles are elliptical, record the results along the major axis of the elliptical bubbles, since that is the weakest portion of the foam glass aggregate. If the bubbles are not uniform, record the largest bubbles, which may be due to inhomogeneity in composition or heat treatment. The direction in the largest bubbles determines the weakest link, and is used to characterize the strength of the product. FIG. 1 shows an example of a foam glass aggregate of the present invention that has been cut to expose the bubbles. The foam glass of FIG. 1 has a density of 63.7 PCF and an intermediate pore size.

The foam glass aggregate of the present invention may have an average pore size of 1.0 mm or less, and preferably 0.7 mm or less, and even more preferably 0.6 mm or less, and even more preferably 0.5 mm or less, and even more preferably 0.4 mm or less, and even more preferably 0.3 mm or less.

As set forth in Table 1, Examples 1-7 are various strong foam glass materials. The foam glass examples set forth in Table 1 herein have densities that vary from 32 PCF to 69 PCF with a corresponding compression strength of 2078 PSI to 14600 PSI and tension strength of 775 PSI to 2,500 PSI, corresponding to a compression strength to weight ratio of 65 to 212 PSI/PCF (pound per square inch divided by pound per cubic foot) and a tension strength to weight ratio of 24 to 36 PSI/PCF. The corresponding properties for composite concrete of the prior art are a density of 140 to 150 PCF and strength of 5000 to 6000 PSI, corresponding to a compression strength to weight ratio of 26 to 43 PSI/PCF. Thus, the foam glass material of Examples 1-7 meet the first requirement for foam glass aggregate to be used in composite concrete of the present invention: a strength to weight ratio higher than composite concrete of the prior art.

The next requirement is that the foam glass aggregate has closed pores; if water from the concrete entered the pores during preparations it would have disadvantageous effects. First, it would increase the density of the foam glass aggregate. Second, the water due to its high pH could react with the foam glass and weaken it. As set forth in Table 1, each of Examples 1-7 also meets the closed pore requirement of the present invention. This is illustrated in FIG. 1, since each of the bubbles shown are clearly separated from each other.

The next requirement is that the foam glass aggregate has strong bonds to the cementatious portion. If upon applying stress to the composite concrete the bonding between the foam glass aggregate and the cementatious portion fails, the strength of the combined product would be significantly reduced.

In order to demonstrate the strong chemical bond of foam glass aggregate with cementatious portion of the composite concrete of the present invention, a Sample 8 was prepared. In Sample 8, a foam glass aggregate was prepared which had a density of 32 PCF, closed pore structure and average pore size of approximately 1 mm. The foam glass of Sample 8 was cut into free form jagged pieces of about 13 mm×13 mm×13 mm in size. These pieces were embedded into a plastic mold containing pre-mixed, commercially available (Lafarge-Portland) cement in staggered positions, so that the distance between the foam glass aggregate pieces varied and the resulting concrete mixture was allowed to harden.

Figure 2:
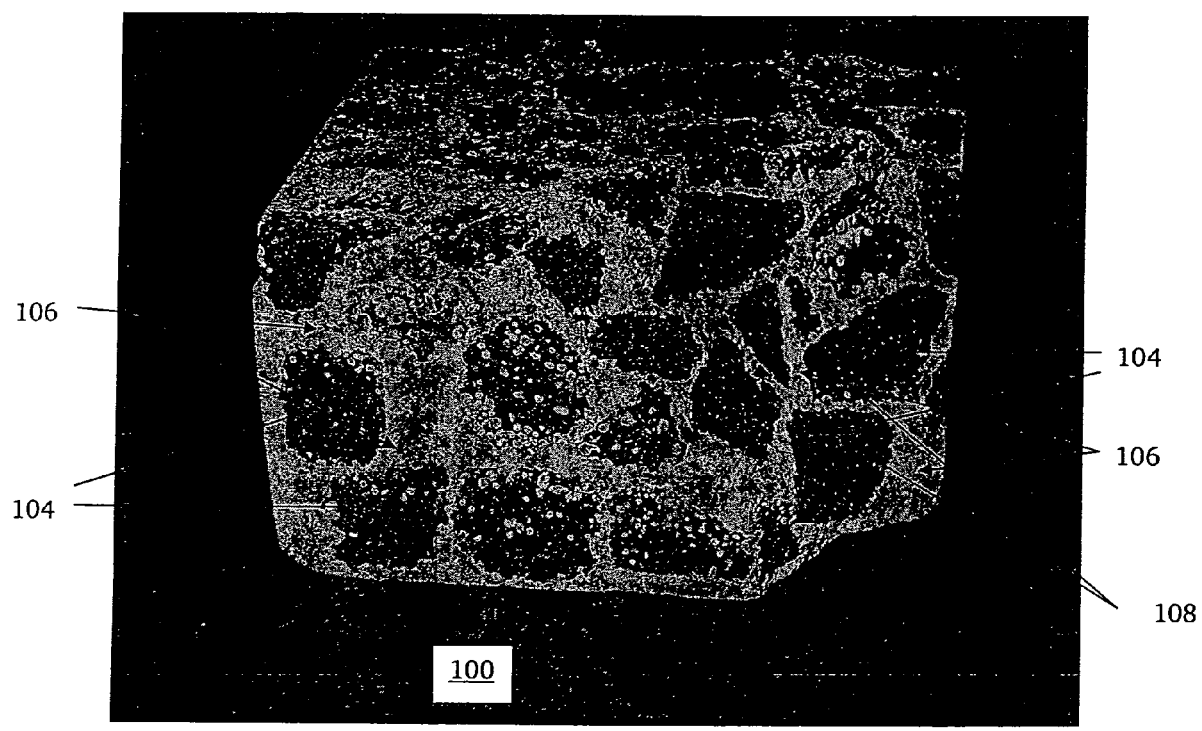
FIG. 2 is a picture of an example of a composite concrete material of the present invention that has been broken to show the fault lines.

To check the strength of the composite concrete of Sample 8, the finished concrete mixture was broken with a hammer and chisel without any serrated fracture lines. FIG. 2 shows a picture of the composite concrete 100 of Sample 8 after being broken. As shown in FIG. 2, the crack was in both the foam glass portions 104 and in the cementatious portions 106, but not in the boundaries 108; thus demonstrating that for this example, the bond was stronger than both phases.

The next requirement is the appropriate selection of the particular size of the foam glass aggregate. In generally, the size of foam glass aggregate must be substantially smaller than the smallest dimension of the composite concrete material to which it is being added. It is also desirable, but not necessary, to use aggregates of different sizes. In Example 8 above, the average size of a foam glass aggregate as shown in FIG. 2 is approximately 13 mm (or about 0.5 in) in its largest diameter. Preferably, the average size of the foam glass aggregate of the present invention is less than approximately 2.0 inches in its largest diameter, and even more preferably less than approximately 1.0 inches in its largest diameter, and even more preferably less than approximately 0.75 inches in its largest diameter, and even more preferably less than approximately 0.5 inches in its largest diameter.

Furthermore, it is also desirable that the average size of the foam glass aggregate be substantially larger than the average pore size. Thus, it is preferable that the average size of the foam glass aggregate of the present invention is larger than 0.1 inches in its largest diameter.

The density of the foam glass aggregate of the present invention depends upon the use to which the composite concrete is intended to be made.

In order to optimize the properties of the concrete used with the foam glass aggregate, various options exist, based on the intended use of the composite concrete. The examples from Table 1 may be used to demonstrate several options, as the properties of foam glass aggregate depend on density and pore size. Example 1 demonstrates an optimum choice if a light composite concrete with a low density is desired. If a concrete that is not only light, but that also has the highest compressional strength is needed, than one should match a foam glass aggregate with a similar strength. Since the highest commonly used composite concrete of the prior art has a compressional strength of 6,000 PSI, there would be little advantage in using a stronger foam glass aggregate. Therefore, Example 4 demonstrates an optimum choice of foam glass material to use as foam glass aggregate with a density of 45 PCF, as it has the lowest density while still maintaining the 6000 PSI compressional strength. If a concrete that is not only light, but that also has the highest tensile strength is needed, and since the highest commonly used composite concrete of the prior art has a tensile strength of approximately 500 PSI, Example 1 demonstrates an optimum choice as it has a tensile strength of 775 PSI with a density of 32 PCF. If an ultimate concrete is needed, one that may develop cracks in the concrete phase yet be supported by the foam glass aggregate, Example 7 would demonstrate an optimum choice as it has a compressional strength of 14,600 PSI, a density of 69 PCF, and a average pore size of 0.3 mm.

A small variation in density between Examples 5, 6 & 7 denotes a large difference in strength, due primarily to the variation in pore size. For any given density, the smallest pore size that is economically achievable is preferable in order to have the maximum strength for that density.

A composite concrete sample of the present invention comprised 60 vol. % of cementatious material, 32.5 vol % of foam glass aggregate having a density of 45 PCF, and an air of 7.5 vol % will have a density of 101 PCF.

A composite concrete sample of the present invention comprised 60 vol. % of cementatious material, 32.5 vol % of foam glass aggregate having a density of 30 PCF, and an air of 7.5 vol % will have a density of 97 PCF.

The composite concrete building material of the present invention may have an average density of less than 110 PCF, and more preferably less than 100 PCF, and most preferably less than 90 PCF.

Thus, foam glass aggregate of the present invention forms the ideal aggregate material to produce a light weight, strong composite concrete.

It will be understood by those skilled in the art that the foregoing method of making the tiles of the present invention could be modified or other methods of fabrication can be used without departing from the spirit and scope of the invention.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A composite concrete building material comprising:
   (A) cementatious material; and
   (B) foam glass aggregates having a closed pore structure, an average density of 30 to 100 PCF, a compression strength of at least 2000 PSI and average pore size of 0.8 mm or less, wherein said average pore size is measured based on the distance between two farthest points of pore surface, wherein said foam glass aggregates are on average approximately 0.1 inches or greater in their largest diameter.

2. The composite concrete building material of claim 1, wherein said cementatious material comprises cement and sand.

3. The composite concrete building material of claim 2, wherein said cementatious material further comprises reinforcing fibers.

4. The composite concrete building material of claim 3, wherein said reinforcing fibers are comprised of one or more of the following materials: glass, steel, titanium, carbon, or Kevlar.

5. The composite concrete building material of claim 1, wherein said foam glass aggregates are on average approximately 2 inches or less in their largest diameter.

6. The composite concrete building material of claim 1, wherein said foam glass aggregates are on average approximately 1.0 inch or less in their largest diameter.

7. The composite concrete building material of claim 1, wherein said foam glass aggregates are on average approximately 0.5 inches or less in their largest diameter.

8. The composite concrete building material of claim 1, wherein an average density of said composite concrete building material is less than 110 PCF.

9. The composite concrete building material of claim 1, wherein an average density of said composite concrete building material is less than 100 PCF.

10. The composite concrete building material of claim 1, wherein said average pore size of said foam glass aggregates is 0.6 mm or less.

11. The composite concrete building material of claim 1, wherein said average pore size of said foam glass aggregates is 0.4 mm or less.

12. The composite concrete building material of claim 1, wherein said average pore size of said foam glass aggregates is 0.2 mm or less.

13. The composite concrete building material of claim 1, wherein said foam glass aggregates have an average density of 80 PCF or less.

14. The composite concrete building material of claim 1, wherein said foam glass aggregates have an average density of 60 PCF or less.

15. The composite concrete building material of claim 1, wherein said foam glass aggregates have an average density of 40 PCF or greater.

16. The composite concrete building material of claim 1, wherein said foam glass aggregates have a compression strength of 3000 PSI or greater.

17. The composite concrete building material of claim 1, wherein said foam glass aggregates have a compression strength of 4000 PSI or greater.

18. The composite concrete building material of claim 1, wherein said foam glass aggregates have a compression strength of 5000 PSI or greater.

19. The composite concrete building material of claim 1, wherein said foam glass aggregates have a compression strength of 6000 PSI or greater.

20. The composite concrete building material of claim 1, wherein said foamed glass aggregates are smaller than the smallest dimension of the composite concrete material to which they are being added, and use aggregates of different sizes.

21. The composite concrete building material of claim 1, wherein said foamed glass aggregates have higher strength to weight ratio than concrete.

22. The composite concrete building material of claim 1, wherein said foamed glass aggregates form a strong bond with said cementatious material when formed into a composite concrete.

23. The composite concrete building material of claim 1, wherein said cementatious material is designed to be used as structural support, in buildings, or for other traditional use requiring strong concrete.

24. The composite concrete building material of claim 1, wherein said cementatious material is designed to be used as support panels, in buildings, or for other traditional use requiring strong concrete.

25. The composite concrete building material of claim 1, wherein said cementatious material is designed to be used as flooring, in buildings, or for other traditional use requiring strong concrete.

26. The composite concrete building material of claim 1, wherein said cementatious material is designed to be used on high rise buildings.

27. The composite concrete building material of claim 1, wherein said cementatious material is designed to be used on bridge structures.

* * * * *